March 4, 1930. A. WICHERT 1,749,554
CUSHIONED WHEEL CONSTRUCTION
Filed April 27, 1927
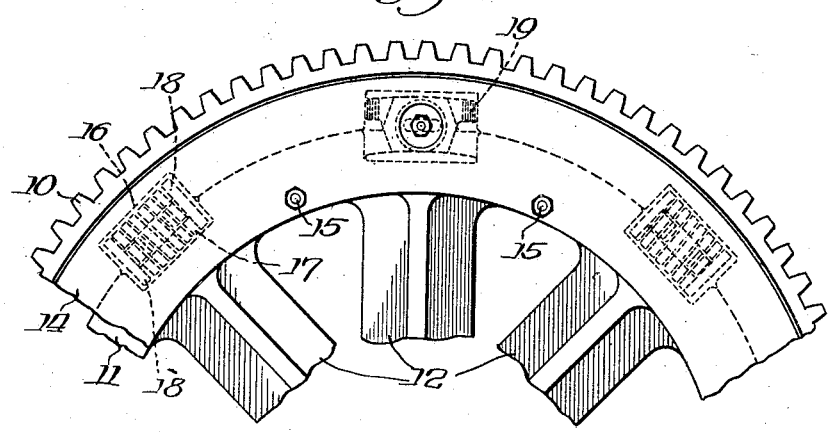
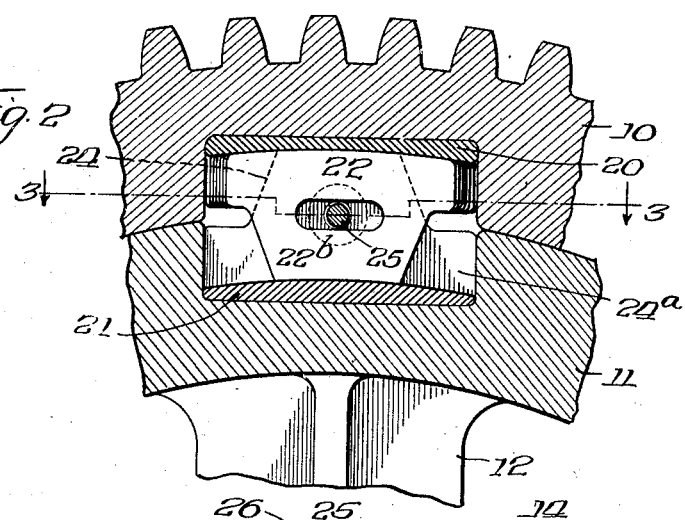
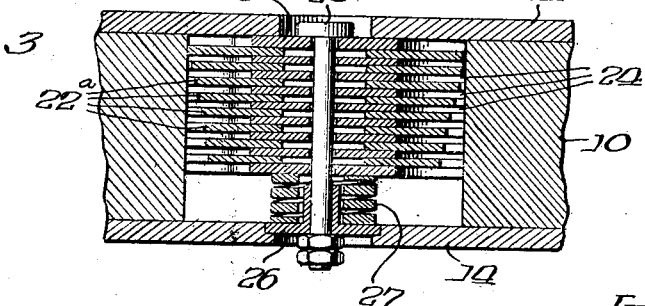
Inventor
Alfred Wichert, Patented Mar. 4, 1930

1,749,554

UNITED STATES PATENT OFFICE

ALFRED WICHERT, OF MANNHEIM-NEUOSTHEIM, GERMANY, ASSIGNOR TO AKTIEN-GESELLSCHAFT BROWN BOVERI & CIE., OF BADEN, SWITZERLAND, A JOINT-STOCK COMPANY OF SWITZERLAND

CUSHIONED-WHEEL CONSTRUCTION

Application filed April 27, 1927, Serial No. 187,087, and in Germany May 7, 1926.

This invention relates to the construction of driving or transmission pinions, pulleys or the like, which contain arrangements for cushioning torque movements for preventing the subjection of driving or driven machines to heavy inertia forces. It is particularly adapted for employment in transmission pinions for actuating the traction wheels of electric cars or locomotives.

The general object of the invention is the provision of a construction which will produce a gradual increasing of the torque effect between the portions of the cushioned pinion or wheel which are connected respectively to the driving and driven elements.

Another object is the provision of a construction which may be embodied in the wheel or pinion in very compact form without requiring an increase in the size thereof or a material weakening of the structure.

A further object is the provision of a device of the sort described in which the cushioning effect and the resistance increasing effect will take place in either rotational direction of the wheel.

Other and further objects will be pointed out or indicated hereinafter or will appear to one skilled in the art upon an understanding of the invention or its employment in practice.

In the drawing forming a part of this specification, I illustrate one construction in which the invention may be embodied, but it is to be understood that this may be varied in particulars of detail or application without departing from the spirit of the invention or the scope of the invention as defined in the appended claims.

In said drawing,

Fig. 1 is a part elevational view of a gear wheel or pinion embodying the invention;

Fig. 2 is a detail in the nature of a part sectional elevation taken on a plane normal to the wheel axis; and Fig. 3 is another detail in the nature of a cross section on substantially line 3—3 of Fig. 2.

In various kinds of machine driving gear, it is desirable to interpose, between the driving machine and the element on which the driving force is expended, a cushioning arrangement for absorbing heavy thrusts resulting from inertia incident to the starting or stopping of the machine, for the protection of the transmission gear and the driving and driven members from excessive sudden torque reactions. It is frequently desirable, moreover, that the relative movement permitted by the cushioning devices be controlled with a damping effect which gradually increases the resistance between the relatively movable portions, so that the transmitted torque and the torque reaction will be gradually increased incident to the overcoming of the inertia and the acceleration of the actuated elements. These results are obtained by the present invention in a manner and by means which will be apparent from the example illustrated in the drawing.

In the construction here shown, Fig. 1 represents a portion of a pinion or wheel having a toothed rim 10 mounted for limited rotational movement on a felly portion 11, which is connected by radial spokes 12 with a hub connected either to the driving or driven element. The rim has power transmitting connection, through its gear teeth, with another element, which may be a driving element or driven element as the case may be. The rim is retained on the felly portion by means of lateral retaining rings 14 secured to the felly by bolts 15. Seated in pockets 16, formed partially in the rim and partially in the felly, are coiled springs 17 with follower plates 18 at the ends thereof, which plates cooperate with the felly and the rim to transmit torque pressures from one to the other, through the medium of the springs 17, in either direction of the wheel's rotation. In other pockets 19, likewise formed partially in the rim and partially in the felly, are disposed the damping or resistance varying devices, which are illustrated in detail in Figs. 2 and 3. These include guide or bearing plates 20 and 21 seated against the bottoms of the pocket portions in the rim and felly, the plate 20 having its inner face concave on the radius from the wheel axis, and plate 21 having its inner face convex on a radius from the wheel axis. Between these plates, and bearing thereon at the top and bottom are the friction plates 22 and 24, arranged alternately. The plates 24 have their end extensions 24$^a$ at their lower parts within the area of the felly, which end extensions have contact with the ends of the felly pocket, while the portions of said plates extending beyond the circumference of the felly are reduced in width so that they are spaced away from the ends of the rim pocket. The plates 22 likewise have end extensions 22$^a$ which, as among the different plates 22, vary in length, so that when said plates are centered in the pocket, said extensions will be spaced from the pocket ends by different distances in the case of the several plates. The portions of plates 22 which extend into the felly pocket are of reduced width, so that they are, at all times, spaced from the ends of the felly pocket. A bolt 25 passes through elongated slots 22$^b$ in the plates 22 and apertures in the plates 24, and it is mounted in end clamping plates 26, between which the plates 22 and 24 are pressed together under the influence of a strong spring 27 held under compression by the bolt 25. The pockets are closed by the side rings 14.

In operation of the device, assuming that a torque is applied to the rim member, and the hub of the wheel is engaged with a driven element exerting considerable inertia, upon the starting of the rim member, it will be moved in a rotational direction upon the felly member, such movement being accommodated by compression of the springs 17. At the start of this movement, frictional resistance will exist between plates 24 and such of plates 22 as have their end projections 22$^a$ in contact with the rearward end of the rim pocket. With the disposal of the plates 22 in the positions illustrated in Fig. 3, this would be only the uppermost of said plates. As the movement of the rim member with respect to the felly progresses, however, the plate 22 having the next longer end projection will be picked up by the rearward end of the rim pocket, thus introducing further frictional resistance between that plate and the plates 24 at its sides. As the relative movement further progresses, the other plates 22 will be picked up in turn by the rearward end of the rim pocket, and the frictional resistance from their movement on juxtaposed plates 24 will be brought into play. Thus the resistance to the relative movement of the rim member and the wheel is gradually increased, with the result that the force transmitted through the wheel will be gradually increased. When the driven machine has thus been brought up to speed, the rim member will be restored to its normal position relative to the felly portion by the expansion of springs 17, thus leaving the forward ends of the plates 22 spaced again at varying distances from the forward end of the rim pocket. Consequently, if a braking effect is now applied to the driven element, it will be transmitted by the plates and springs to the rim member, which will already have been relieved of the driving power. The transmission of this braking pressure will cause the springs to be partially compressed, and when the braking pressure is relieved, the springs will return the rim and felly to normal position, incident to which some of the plates 22 will be moved back so that their rearward ends will be out of alignment with those of others of said plates. Thus the plates 22 are left in position to be picked up, one after another, incident to the next starting operation in either direction.

What I claim is:

1. In a wheel construction, the combination with a power receiving portion and a power transmitting portion connected for limited relative rotational movement, of buffing means for opposing spring resistance to such relative rotational movement, cooperating friction plates operated by said portions to interpose frictional resistance to their relative rotational movement, said friction plates being rendered effective consecutively incident to such relative rotational movement to increase the frictional resistance progressively.

2. In a driving wheel, hub and rim portions disposed for relative rotary movement with respect to each other about a common axis, and means operable to oppose such movement with an action increasing in effect as such movement continues in a given direction; said means including a first and a second set of plates, the plates of the first set being disposed in frictional engaging relation with the respective plates of the second set and having limited and varying play with respect to one of said wheel portions.

3. In a driving wheel, hub and rim portions disposed for relative rotary movement with respect to each other about a common axis and provided with complementary and oppositely disposed recesses forming a pocket, and means disposed in said pocket and being operable to oppose such movement with an action increasing in effect as such movement continues in a given direction; said means including a first and a second set of plates, the plates comprising the first set being received by and having a close fit in one of said recesses, the plates comprising the second set being received by and having predetermined and different amounts of play in the other of said recesses and being complementary to and disposed in frictional engaging relation with the respective plates comprising the first set.

In testimony whereof I have hereunto subscribed my name this 11th day of April A. D., 1927, at Munich, Germany.

ALFRED WICHERT.